United States Patent [19]

Schwefel

[11] Patent Number: 4,462,083
[45] Date of Patent: Jul. 24, 1984

[54] METHOD OF INTERVAL INTERPOLATION

[75] Inventor: Ernst Schwefel, Traunreut, Fed. Rep. of Germany

[73] Assignee: Dr. Johannes Heidenhain GmbH, Traunreut, Fed. Rep. of Germany

[21] Appl. No.: 276,978

[22] Filed: Jun. 24, 1981

[30] Foreign Application Priority Data

Jun. 30, 1980 [DE] Fed. Rep. of Germany ....... 3024716

[51] Int. Cl.³ ........................................... G06F 15/353
[52] U.S. Cl. .................................... 364/577; 364/571; 364/723
[58] Field of Search ............... 364/571, 577, 723, 567; 235/92 MP, 92 PS

[56] References Cited

U.S. PATENT DOCUMENTS

| | | | |
|---|---|---|---|
| 3,720,813 | 3/1973 | Badessa | 364/577 |
| 4,080,657 | 3/1978 | Caldicott et al. | 364/571 |
| 4,205,575 | 6/1980 | Hoskinson et al. | 364/723 |
| 4,225,931 | 9/1980 | Schwefel | 364/577 |
| 4,231,097 | 10/1980 | Shibayama et al. | 364/577 |
| 4,330,837 | 5/1982 | Itani | 364/567 |

Primary Examiner—Gary Chin
Attorney, Agent, or Firm—Willian, Brinks, Olds, Hofer, Gilson & Lione, Ltd.

[57] ABSTRACT

An improved method of interval interpolation, i.e., subdivision of a signal period, is disclosed. Generally, at least one scanning signal ($S_1$, $S_2$) generated by a scanning unit (G) scanning a scale (M) is converted into digital form and input to a computer (R) for the computation of interpolation values. In the case of a high subdivision factor, before the execution of the interpolation algorithm, the scanning signals input to the computer (R) are corrected for amplitude inequality, incorrect phase differential and the direct voltage component of the scanning signals ($S_1$, $S_2$). The correction values are automatically determined by direct voltage detectors ($GT_1$, $GT_2$), amplitude detectors ($AT_1$, $AT_2$) and a phase comparator (PV) during at least one pass of the measuring system (G, M) over its measuring interval. The correction values are stored in the computer (R) and are automatically utilized thereby in interpolation during measurement.

8 Claims, 1 Drawing Figure

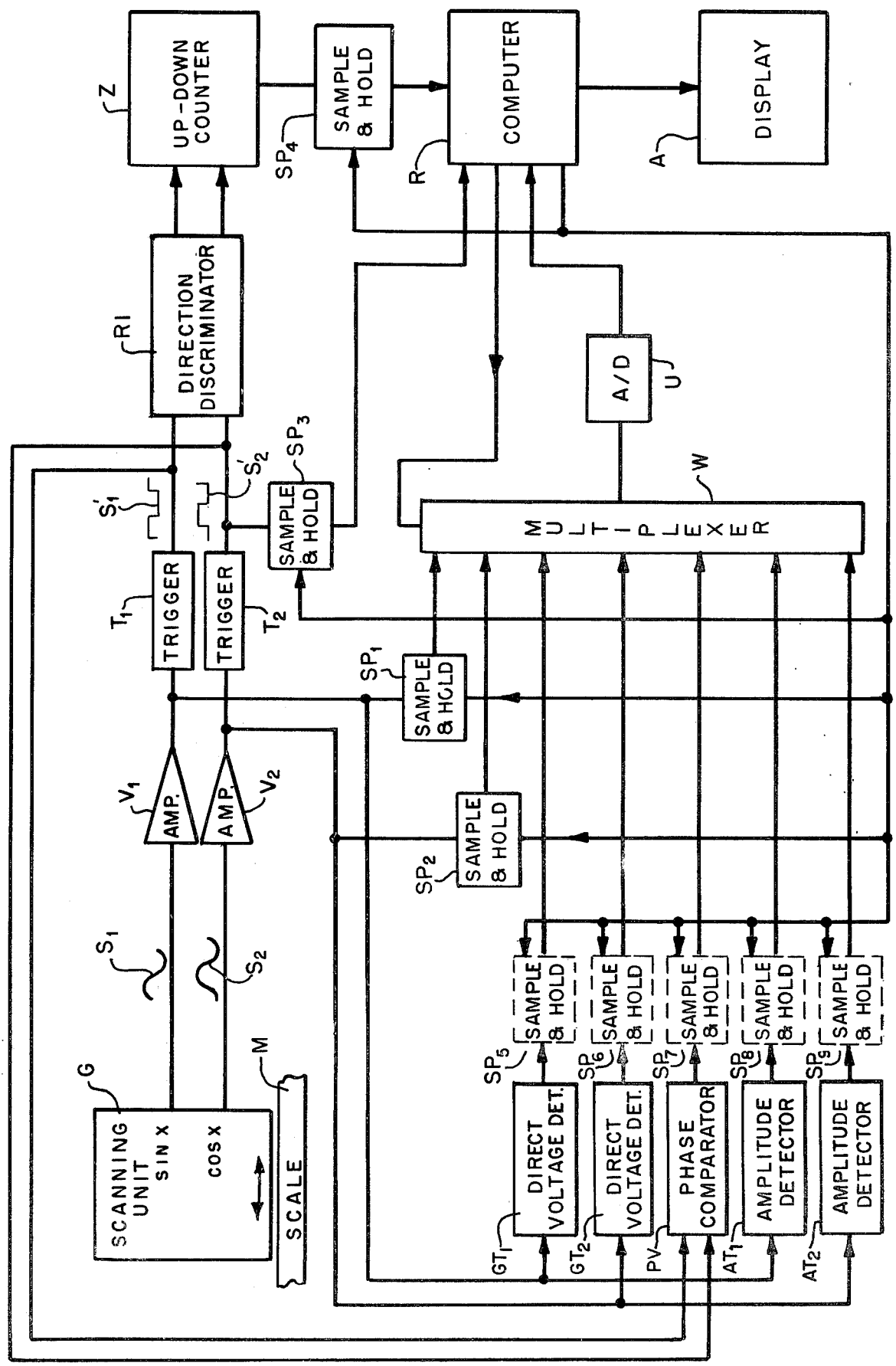

METHOD OF INTERVAL INTERPOLATION

BACKGROUND OF THE INVENTION

This invention relates to improvements in a method of interpolating intervals in a measuring system.

"Interpolation" of an interval, such as a path interval, as used herein, means the subdivision of a signal period defined by the grid constant, or grid separation, of a grid measuring scale into a plurality of periods or subintervals. According to U.S. Pat. No. 4,225,931, the interpolation of an interval can be accomplished by converting at least one analog signal generated by a scanning unit which scans the scale into digital form by a converter, and feeding the digital signals into a digital computer for the automatic calculation therefrom of interpolation values within the signal period. The digital computer also receives as inputs the count of an up-down counter, and a binary control signal. The computer R is programmed to combine the values of the full signal period provided by the counter Z and the computed interpolation values to generate an interpolated position value. A display unit indicates the relative position of the scale and scanning unit in numerical form.

In the case of a high subdivision factor, for the evaluation of phase-shifted analog signals, it is necessary to optimize the signals for parameters of symmetry (involving the elimination of the signal direct-voltage component), amplitude equality, and required phase difference between signals.

For this purpose, U.S. Pat. No. 4,225,931 teaches the correction of the input digital signals for these parameters before the execution of the interpolation process. The correction is made by the computer according to correction values taken from a correction table which has previously been programmed into and stored in the computer. This method, however, requires the predetermination of the correction values, and the programming thereof into the computer.

SUMMARY OF THE INVENTION

The invention relates to improvements in the method of interpolating the intervals in a measuring system which preferably comprises a scale, a scanning unit for scanning the scale and generating analog signals in response thereto, means for converting at least one analog signal to digital form, and computer means for calculating interpolation values from the signals.

In order to improve the accuracy of the interpolation of the intervals, it is important to eliminate the direct-voltage component of the analog signals; equalize the amplitude of the analog signals; and set the proper phase difference between the analog signals. The improvements in the method of interpolation include the steps of automatically determining at least one correction value for each of the direct voltage component, the amplitude, and the phase difference of the analog signals, during at least one pass of the measuring system over the measuring interval of the system; storing the correction values in the computer means; and automatically utilizing the stored correction values by the computer means to eliminate the direct-voltage component, equalize the amplitude, and set the proper phase difference of the analog signals in interpolation during measurement.

The improvements alleviate disadvantages experienced by the prior method of interpolating the intervals in a measuring system. For example, the improved method has the advantage that manual, or prior, programming of the correction values into the computer is avoided. Also, correction values which are automatically determined during a pass of the measuring system over the system's measuring interval are customized for that system, that is, they are the true correction values for that particular piece of apparatus. These and other advantages of the present invention will become more apparent during the following description of the presently preferred embodiment of the invention, considered together with the drawing.

BRIEF DESCRIPTION OF THE FIGURE

The drawing is a block diagram of a preferred measuring system which practices the preferred embodiment of the interpolation method of this invention.

DETAILED DESCRIPTION OF THE PREFERRED EMBODIMENT

Turning now to the FIGURE, there is shown, in block diagram form, a linear incremental measuring system wherein a grid scale M is scanned by a scanning unit G. The scale M and scanning unit G are preferably attached one to the bed and the other to the slide of a measuring or a processing machine (not shown). The scale M and scanning unit G are movable relative to each other in the direction indicated by the arrow.

The scanning unit G includes a reticle (not shown), an arrangement (not shown) for illuminating the scale and the reticle, and photoelectric elements (not shown) which convert the light beam, modulated by the grids of the scale M and the reticle, into sinusoidal analog output scanning signals $S_1$ and $S_2$ which are phase-displaced relative to each other by 90°. The signal $S_1$ represents the sine and the signal $S_2$ represents the cosine of the light beam modulation. The analog signals $S_1$ and $S_2$ are input to amplifiers $V_1$ and $V_2$, and therefrom to trigger circuits $T_1$ and $T_2$ which convert the analog signals $S_1$ and $S_2$ into square wave signals $S_1'$ and $S_2'$. The square wave signals $S_1'$ and $S_2'$ enter a direction discriminator RI. In response thereto, the discriminator RI generates impulses, along with the correct algebraic (+ or −) sign, and outputs these to an up-down counter Z, which counts them.

To interpolate, or subdivide, the signal period into a plurality of digital steps, a digital computer R is used. Preferably, the computer R is a minicomputer or a microprocessor.

The apparatus shown in the drawing performs the interpolation of the signal period during the relative movement of the scale M and scanning unit G. The analog scanning signals $S_1$ and $S_2$ output by the scanning unit G, after amplification by the amplifiers $V_1$ and $V_2$, are also input to sample-and-hold circuits $SP_1$ and $SP_2$, respectively. The sample-and-hold circuits $SP_1$ and $SP_2$ are connected to a multiplexer W which, under the control of the computer R, alternately connects the circuits $SP_1$ and $SP_2$ to an analog-to-digital converter U. The converter U converts the analog signals $S_1$ and $S_2$ into digital form, and the digital signals are input to the digital computer R for use in the computation of interpolation values within a signal period. The computer R also receives as inputs, through sample-and-hold circuits $SP_4$ and $SP_3$, respectively, the count of the up-down counter Z and a binary control signal which is the square wave signal $S_{2'}$. The computer R is programmed to combine the values of the full signal period provided by the counter Z and the computed interpolation values to generate an interpolation position value. A numerical display unit A is connected to the computer R and displays the present relative position of the scale M and the scanning unit G. Preferably, the computer R brings about the display on the display unit A of the interpolated relative position, which corresponds to the actual relative position, as opposed to the incremental, full signal period approximation of the actual relative position.

In the case of a high subdivision factor, which is realizable with the digital computer R, it is desirable to make a correction to the digital signals, which correspond with the analog signals $S_1$ and $S_2$, before their use in the interpolation process. The preferred correction assures signal symmetry, signal amplitude equality, and 90° signal phase displacement. The correction to the digital signals which correspond with the analog signals $S_1$ and $S_2$ is expediently made by the computer R before the application thereto of the interpolation algorithm. The computer R brings about a synchronization between the full signal period transition of the up-down counter Z and of the interpolated signal period transition.

The preferred correction values are preferably generated as follows. Subsequent to amplification by amplifiers $V_1$ and $V_2$, the analog signals $S_1$ and $S_2$ are input to direct-voltage detectors $GT_1$ and $GT_2$, respectively, for the determination of the respective signal direct-voltage constituents. The amplified analog signals $S_1$ and $S_2$ are also input to amplitude detectors $AT_1$ and $AT_2$, for the determination of the peak amplitudes of the respective signals. And the squared signals $S_1'$ and $S_2'$ are input to a phase comparator PV for the determination of their phase difference. The correction values appear at the outputs of the detectors $GT_1$, $GT_2$, $At_1$, $AT_2$ and the comparator PV. The outputs of the detectors $GT_1$, $GT_2$, $AT_1$, $AT_2$ and the comparator PV can be connected directly to the inputs of the multiplexer W. Alternatively, analog storage means, such as sample-and-hold circuits $SP_5$, $SP_6$, $SP_7$, $SP_8$, and $SP_9$ are connected between the outputs of the detectors $GT_1$, $GT_2$, $AT_1$, $AT_2$ and the comparator PV, respectively, and the inputs of the multiplexer W. The sampling and storing of the signal values by the sample-and-hold circuits $SP_5$–$SP_9$ is controlled by the computer R.

The correction values are automatically determined by the detectors $GT_1$, $GT_2$, $AT_1$, $AT_2$ and the comparator PV during at least one pass of the measuring system over its measuring interval. At least one correction value for each of the direct-voltage component, the amplitude, and the phase difference is determined during the at least one pass over the measuring interval. Each correction value computed for one of the correction parameters is applicable to that segment of the measuring interval during the pass of which it was calculated. The correction values are serially fed by the multiplexer W to the analog-to-digital converter U, where they are converted to digital form. From the converter U the digitized correction values pass to the computer R where they are stored in the form of a correction table. Alternatively, the correction values may be stored in the form of a plurality of signal values. During measuring operation of the measuring system, the stored correction values are automatically utilized by the computer R in the interpolation process. If a plurality of correction values had been calculated and stored for each parameter, each of the plurality of correction values is automatically applied by the computer in the interpolation of that segment of the measuring interval during the pass of which it had been calculated.

Of course, it should be understood that various changes and modifications to the preferred embodiment described above will be apparent to those skilled in the art. For example, the process can be utilized with length or angle measuring systems, or any other systems utilizing periodic incrementation. The invention is not restricted to photoelectric systems, but may be utilized with inductive, magnetic, capacitive and other systems. Nor is the invention restricted to digital systems. The invention is also usable with signals other than sinusoidal, for example with triangular analog signals. These and other changes can be made without departing from the spirit and the scope of the invention, and without diminishing its attendant advantages. It is therefore intended that all such changes and modifications be covered by the following claims.

I claim:

1. In a position measuring system comprising a measuring scale, a scanning unit for scanning the scale and generating at least two periodic analog signals in response to relative movement between the scale and the scanning unit, an evaluating arrangement for processing the analog signals, means for generating digital signals corresponding to the analog signals, and an interpolating arrangement, included in the evaluating arrangement and responsive to the digital signals, which comprises a computer for computing interpolation values within a signal period of the periodic analog signals, wherein the computer comprises means for correcting the digital signals prior to the computation of interpolation values by use of a plurality of previously determined correction values in order to improve accuracy of the interpolation values, the improvement comprising:

a plurality of detector elements responsive to the analog signals, each detector element operative automatically to generate a respective correction signal in response to at least one of the analog signals during relative movement between the scale and the scanning unit, each of said correction signals indicative of a respective signal parameter characteristic of at least one of the analog signals and chosen from the group consisting of: direct voltage component, amplitude, and phase difference of the analog signals and means for providing the correction signals as the correction values to the computer;

said detector elements and providing means cooperating automatically to determine and supply the correction values to the computer.

2. The invention of claim 1 wherein the detector elements comprise a direct voltage detector operative to generate and output signal indicative of the direct voltage component of one of the analog signals, and wherein the output signal is included in the correction signals.

3. The invention of claim 1 wherein the detector elements comprise an amplitude detector operative to generate an output signal indicative of the amplitude of one of the analog signals, and wherein the output signal is included in the correction signals.

4. The invention of claim 1 wherein the detector elements comprise a phase comparator operative to generate an output signal indicative of the phase difference between the two analog signals, and wherein the output signal is included in the correction signals.

5. The invention of claim 1 wherein the detector elements automatically determine the corresponding correction signals as the scanning unit scans the entire scale.

6. The invention of claim 1 further comprising means for storing the correction values in digital form.

7. The invention of claim 1 further comprising means for storing the correction signals in analog form.

8. The invention of claim 1 further comprising:
means for storing the correction signals in analog form in response to a command issued by the computer;
means for digitizing the stored correction signals; and
means for storing the digitized correction signal in the computer.

* * * * *